United States Patent [19]

Kennedy

[11] Patent Number: 5,503,181

[45] Date of Patent: Apr. 2, 1996

[54] FLOOR SINK PROTECTOR

[76] Inventor: James M. Kennedy, 819 E. 575 N, American Fork, Utah 84003

[21] Appl. No.: 278,828

[22] Filed: Jul. 22, 1994

[51] Int. Cl.⁶ .................................. F16L 5/00; A47K 3/02
[52] U.S. Cl. ................................. 137/362; 52/DIG. 12; 4/580
[58] Field of Search ......................... 52/169.5, DIG. 12; 137/362; 220/200; 4/580

[56] References Cited

U.S. PATENT DOCUMENTS

| | | | |
|---|---|---|---|
| 1,051,757 | 1/1913 | Powers | 137/362 |
| 3,633,219 | 1/1972 | Byrd | 137/363 |
| 4,308,701 | 1/1982 | Wojick | 52/DIG. 12 |
| 4,922,948 | 5/1990 | Van Dijk | 137/362 |

*Primary Examiner*—A. Michael Chambers

[57] ABSTRACT

A floor sink protector including a box to be positioned in a standard floor sink and over a sink drain; and a lid to close an upper open end of the box and having brackets and a boss on a face thereof to respectively extend into frictional engagement with an interior of a wall of the box and to receive one end of a conduit having an opposite end threaded into the drain.

4 Claims, 1 Drawing Sheet

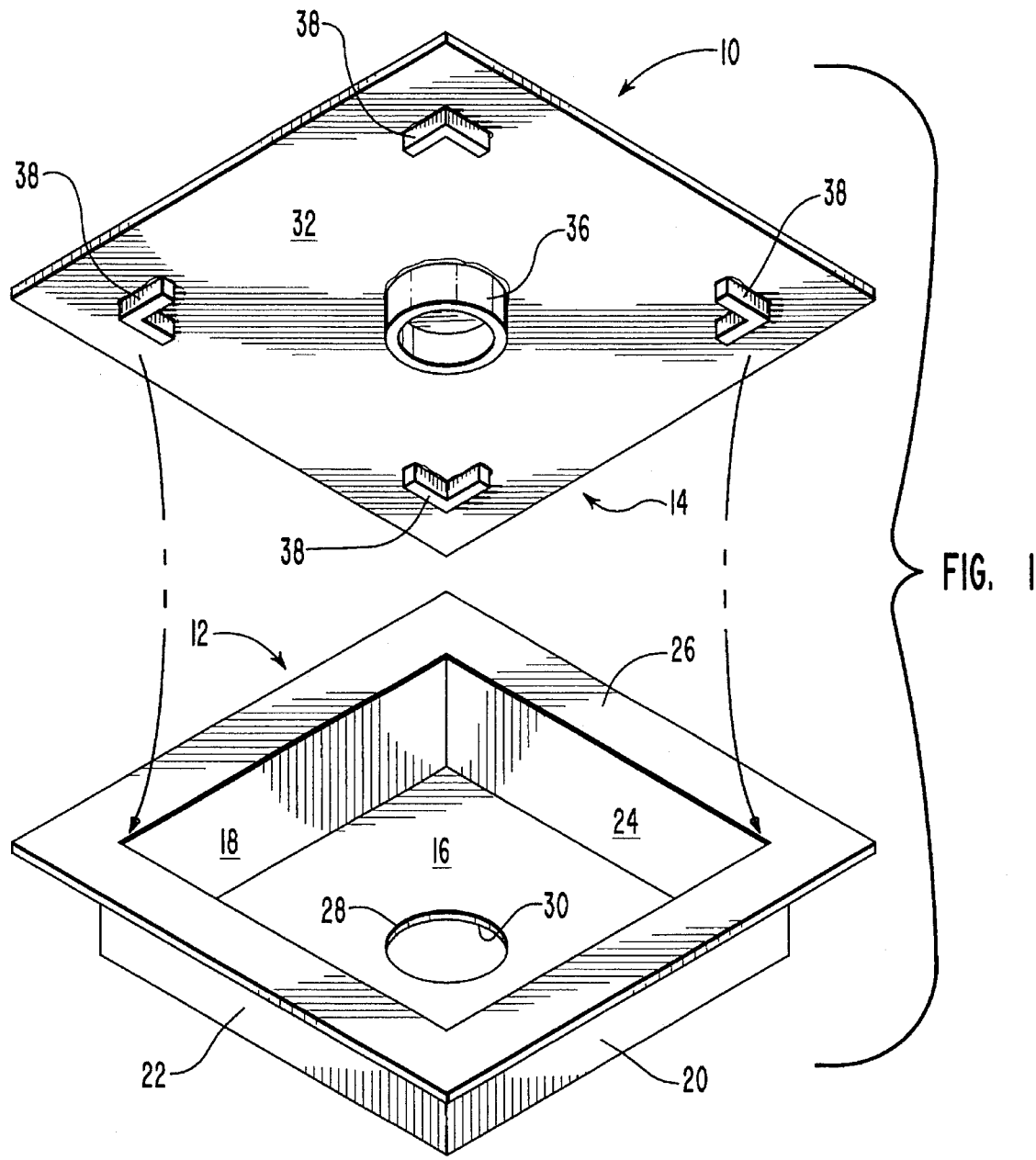
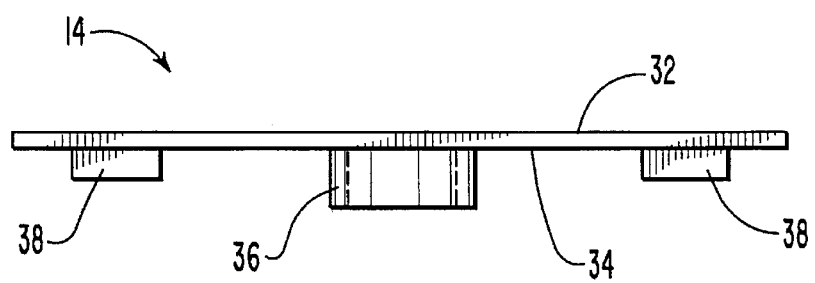

FLOOR SINK PROTECTOR

BRIEF DESCRIPTION OF THE INVENTION

1. Field of the Invention

The present invention relates to floor sinks and protectors used to prevent undesired debris accumulation in such floor sinks.

2. Prior Art

For quite some time many contractors have been complying with building construction plans and have formed floor sinks around floor drains as a means of collecting heavy discharges of liquids from a floor surface as the liquids are discharged at a uniform rate through the floor drains or in the event the floor drains become plugged.

More recently States and local communities have legislated or ordered the use of such floor drains as a means of insuring proper sanitation in public buildings such as restaurants, bars and other food preparation centers as a means of improving sanitary conditions. Generally, at least one such floor sink is provided beneath each food preparation center.

It has been found, however, that during initial construction of a building with the floor drains or during building re-modeling to install such drains cement, grout and other debris can easily collect in the sinks. It is not uncommon that the sinks actually become filled with construction debris and must be cleaned out before use. The time and labor required for such cleaning-out is costly and is something that can be easily avoided using the floor sink protect or of the present invention.

OBJECTS OF THE INVENTION

Principal objects of the present invention are to provide a floor sink protector that is inexpensive to produce, that is easy to use and that will effectively prevent debris accumulation in a floor sink from the initial construction of the floor sink until all construction work in the vicinity of the floor sink is completed.

FEATURES OF THE INVENTION

Principal features of the invention include an open-topped, rectangular box shaped and sized to fit in a constructed floor sink. The box has a central opening through a bottom thereof that will, when the box is installed in a floor sink, overlie the floor drain positioned centrally within the floor sink.

A flange is formed on the top surface of the wall of the box and the wall has a depth that will allow the bottom surface of the box to rest on or closely adjacent to the bottom surface of the floor sink while the flange extends beyond the floor sink and rests on the building floor.

A lid is provided to close the open upper end of the box. The lid includes a flat surface that will overlie the flange. A boss is formed on the underside of said surface and centrally of the lid to telecopingly receive the upper end of a length of conduit having its lower end threaded into the floor drain. L-shaped brackets are provided on the underside of the flat surface to project snugly into the corners of the box where the lid is placed on the open upper end of the box and overlying the flange.

Additional objects and features of the invention will become apparent to those skilled in the art to which the invention pertains from the detailed description and claims, taken together with the accopanying drawing.

THE DRAWING

In the drawing:

FIG. 1 is an exploded perspective view of the floor sink protector of the invention; and FIG. 2 is a side elevation view of a lid of the protector removed from a box of the protector.

DETAILED DESCRIPTION

Referring now to the drawings:

In the illustrated preferred embodiment of the invention, the floor sink protector is shown generally at 10 and includes a box 12 and a lid 14.

Box 10 is shaped in the form of a rectangle and includes a bottom 16 interconnecting spaced apart opposing walls 18 and 20 and another pair of spaced apart opposing side walls 22 and 24 that interconnect the walls 18 and 20.

A flange 26 projects from and normal to upper edges of the walls 18 and 20 and walls 22 and 24 so that the flange will overlie the upper edge of a standard rectangular shaped floor sink (not shown). A hole 28 positioned centrally through a bottom surface 30 of box 10 is adapted to overlie a central drain of the standard floor sink.

The lid 14 includes a flat surface 32 that is sized and shaped to overlie the flange 26. An underface 34 of lid 14 has a boss 36 projecting centrally therefrom. L-shaped brackets 38 project downwardly from the underface 34 with the brackets being positioned such that when the lid surface 28 overlies the walls 18, 20, 22, and 24 the brackets extend snugly into the corners formed by interconnecting adjacent walls.

The boss 36 will telescopingly fit over one end of a length of conduit (not shown) having its other end threaded into the central drain of the floor sink.

In use, the box 12 of the floor sink protector is placed in a floor sink, with the flange 26 resting on the floor (not shown) in which the floor sink is formed and with the bottom surface 30 of the box resting on or closely spaced above the bottom of the floor sink. The hole 28 is positioned over the central drain of the floor sink. A length of conduit (not shown) has one end threaded into the drain of the floor sink and its opposite end positioned to receive the boss 36 of lid 14 thereon.

Lid 14 is positioned over the flange 26, with the L-shaped brackets 38 each fitting into a corner formed by interconnecting, adjacent side walls of the box 12. The box 12 and lid 14 are left in position so long as is necessary to protect the box 10 against construction debris or other materials falling into the floor sink. Thereafter both the box 12 and lid 14 are removed from the floor sink.

Although a preferred embodiment of my invention has been herein disclosed, it is to be understood that the present disclosure is by way of example and that variations are possible without departing from the scope of the following claims, which subject matter I regard as my invention.

I claim:

1. A floor sink protector comprising
   a box having a bottom, a sidewall with a smooth outer surface projecting from the periphery of said bottom and forming an open top of said box; a central hole through said bottom, and a flange projecting normal to said sidewall around said open top; and a lid having a flat, unbroken surface sized to overlie the flange, and having an undersurface with brackets extending therefrom to fit snugly against an inside of the wall of the box and wherein said box is sized to fit into a floor sink with the central hole through the bottom thereof overlying a central drain of the floor sink and the flange resting on a building floor surrounding the floor sink.

2. A floor sink protector as in claim 1, wherein said box is of rectangular configuration and wherein said sidewall is formed by interconnected side walls.

3. A floor sink protector as in claim 2, wherein said brackets extending from an undersurface of said flat surface unbroken of said lid are L-shaped brackets, each fitting snugly into a corner formed by interconnecting walls of said box.

4. A floor sink protector as in claim 3 further including a boss formed in the center of said undersurface of said lid, said boss fitting over one end of a conduit having its other end threaded into a drain of a floor sink in which said box is positioned.

\* \* \* \* \*